Oct. 6, 1970 R. C. GUTBERLET ETAL 3,532,230
HIGH SPEED COUNTER STACKER FOR FLEXIBLE ARTICLES
Filed April 12, 1968 6 Sheets-Sheet 5

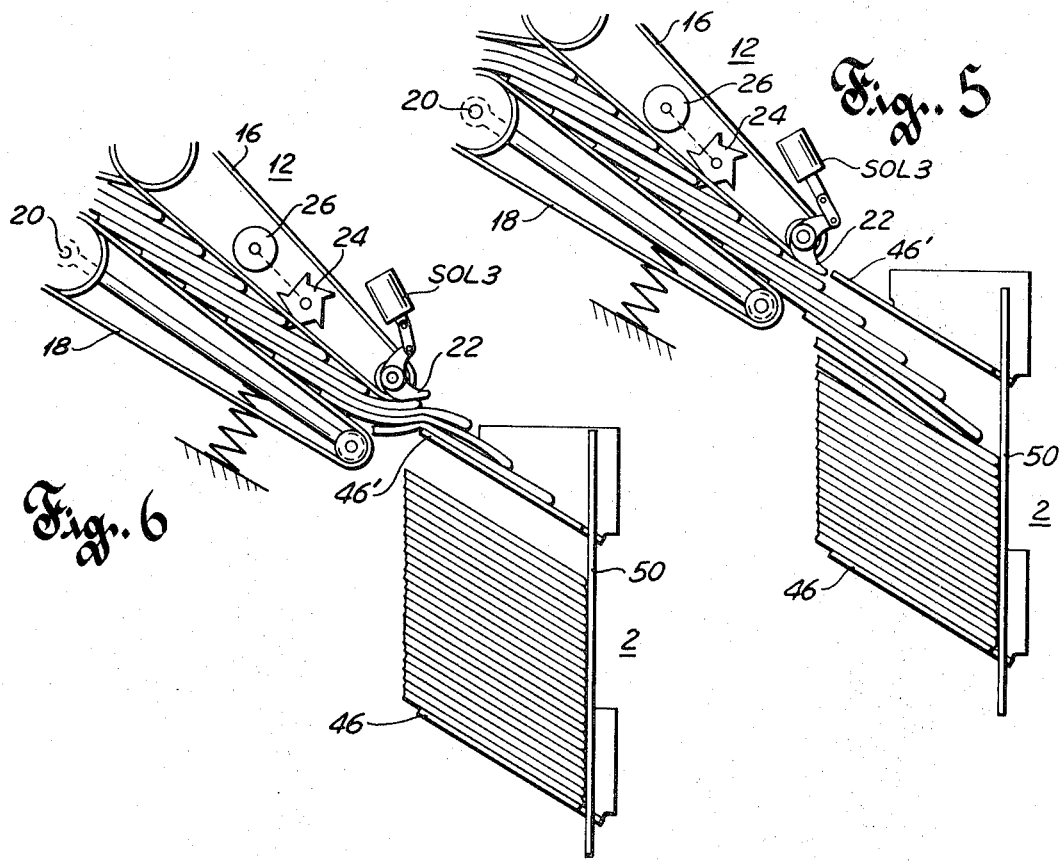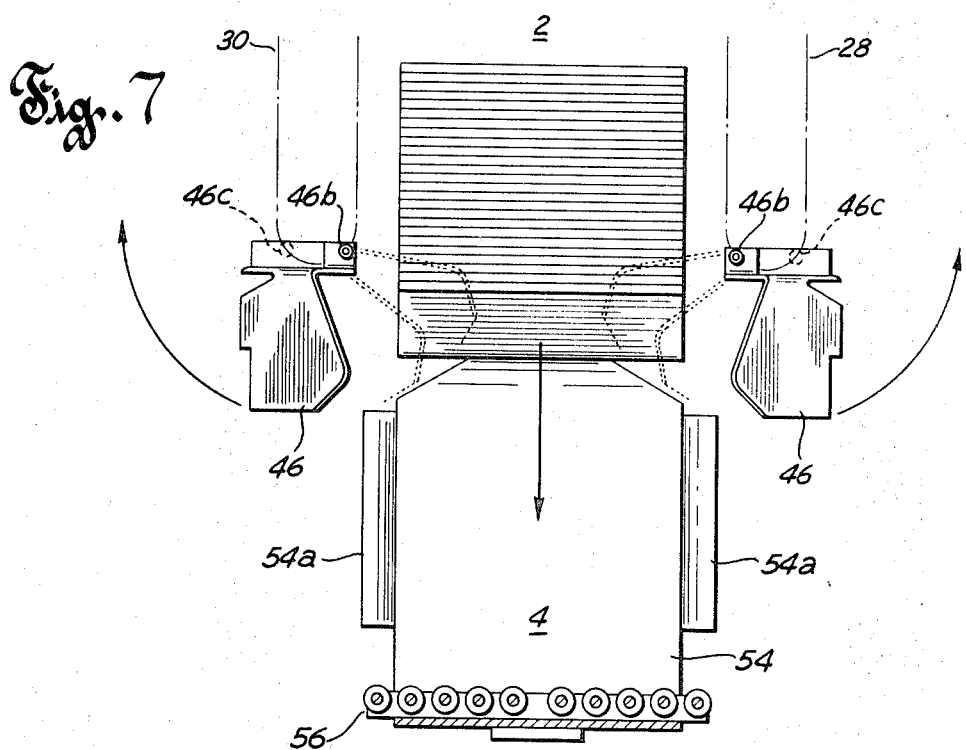

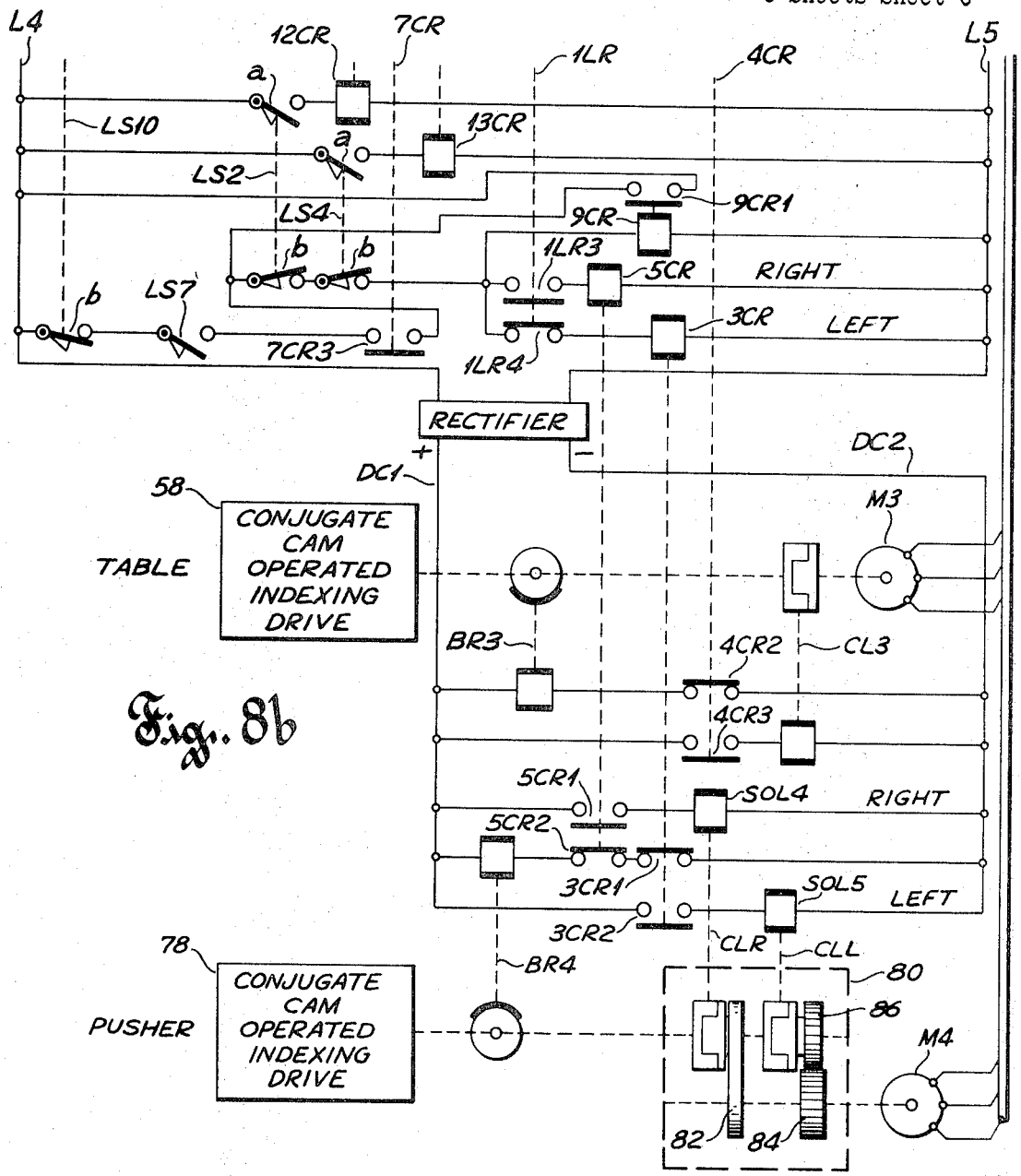
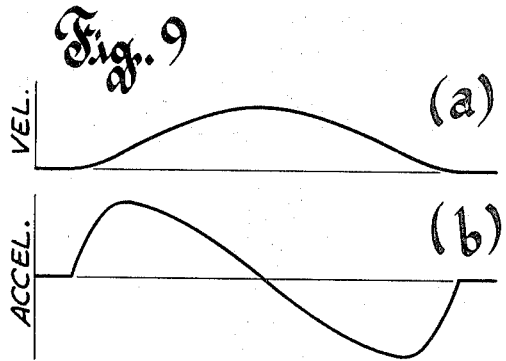
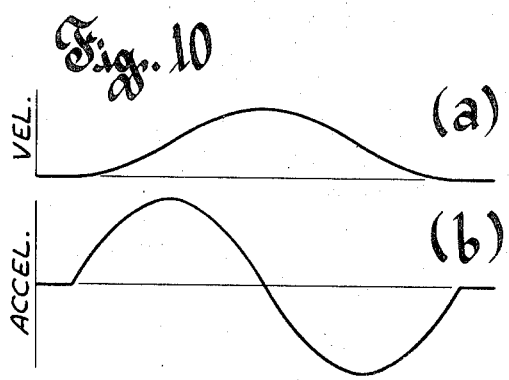

United States Patent Office 3,532,230
Patented Oct. 6, 1970

3,532,230
HIGH SPEED COUNTER STACKER FOR FLEXIBLE ARTICLES
Robert C. Gutberlet, Milwaukee, and Frederic E. Howdle, Wauwatosa, Wis., assignors to Cutler-Hammer, Inc., Milwaukee, Wis., a corporation of Delaware
Filed Apr. 12, 1968, Ser. No. 720,774
Int. Cl. B65g 57/09; B65h 31/10
U.S. Cl. 214—6
6 Claims

ABSTRACT OF THE DISCLOSURE

A plurality of chain mounted blade pairs are driven vertically downward past the output end of a lapped stream newspaper conveyor to cooperatively form successive split stacking platforms. The blade pairs are indexed first to intercept the stream at a predetermined paper according to a counting and timing scheme and are subsequently indexed to a stacking position. A next succeeding blade pair assume a ready-to-intercept position and a preceding blade pair travel around respective lower sprockets to release the article batch stacked thereon for free fall to a table.

A plurality of chain mounted pusher pairs are cooperatively driven horizontally across the table to the right, left or alternately right and left to push the batch onto delivery conveyors. The table may be rotated 180 degrees for receiving a subsequent batch on top of a previous batch.

BACKGROUND OF THE INVENTION

This invention relates to machines for counting and stacking flexible articles and more particularly to such machines for counting newspapers or the like as they are fed into the machine from a press conveyor and for stacking such newspapers in batches of predetermined numbers.

An example of a machine for accomplishing counting and stacking functions of newspapers from a press conveyor is shown in the F. E. Howdle et al. Re. Pat. No. Re. 25,018 issued Aug. 8, 1961 and assigned to the assignee of this invention. This machine was designed to handle newspapers at press speeds up to 60,000 issues per hour. The machine utilized a large number of pneumatic motors, or air cylinders, to provide the necessary correlated movements.

With press speeds increasing to 72,000 impressions per hour and more, faster counting and stacking machines are required. The cycle times of new machines must be reduced, thereby requiring each component in the machine to act faster and be under precision timing and control. These requirements have surpassed the characteristics of the pneumatic motor relied on in the prior art machine. Variations in air pressure supplied to pneumatic motors places tolerances on the operating times of the motors which are too wide for precision control. Additionally, at the high speeds at which the components must move, the abrupt stop movements of the linear pneumatic motor create an objectionable amount of bounce.

Thus, to accomplish the same end result at substantially greater press speeds, an approach utilizing more accurately controlled electromechanical concepts has been followed. Where applicable, moving parts of the machine of this invention are provided with rotary mechanical drives which provide controlled acceleration and velocity to eliminate abrupt starting and stopping. This is particularly advantageous in the output portion of the machine wherein a large and relatively unstable stack of papers must be rapidly driven out of the machine. The new combination of design concepts herein presented have produced a machine capable of handling papers at press speeds up to 90,000 impressions per hour.

SUMMARY OF THE INVENTION

It is therefor a primary object of this invention to provide a machine for counting and stacking flexible articles which has a reduced cycle time.

It is a further object of this invention to provide a machine for counting and stacking flexible articles in which the movable components thereof are driven by rotary electromechanical drives under percision control.

It is a still further object of this invention to provide a machine for counting and stacking flexible articles in which high speed movement of unstable stacks is afforded through the use of controlled acceleration and velocity devices.

These and other objects and advantages of this invention will become more apparent in the following specification and claims, when read in conjunction with the accompanying drawings.

DESCRIPTION OF THE DRAWINGS

FIG. 5 is a fragmentary side view of the stacking section of the machine showing one operational position of the mechanism;

FIG. 6 is a fragmentary side view similar to FIG. 5 but showing another operational position of the mechanism;

FIG. 7 is a fragmentary front view of the mechanism showing a stack of articles being deposited upon a receiving table;

FIGS. 8a and 8b, when taken together, represent a schematic diagram of an electrical control circuit for the counter stacker machine;

FIG. 9, a and b, are velocity and acceleration curves, respectively, for one portion of the machine; and FIG. 10, a and b, are velocity and acceleration curves for another portion of the machine.

DESCRIPTION OF THE PREFERRED EMBODIMENT

Figure 1:
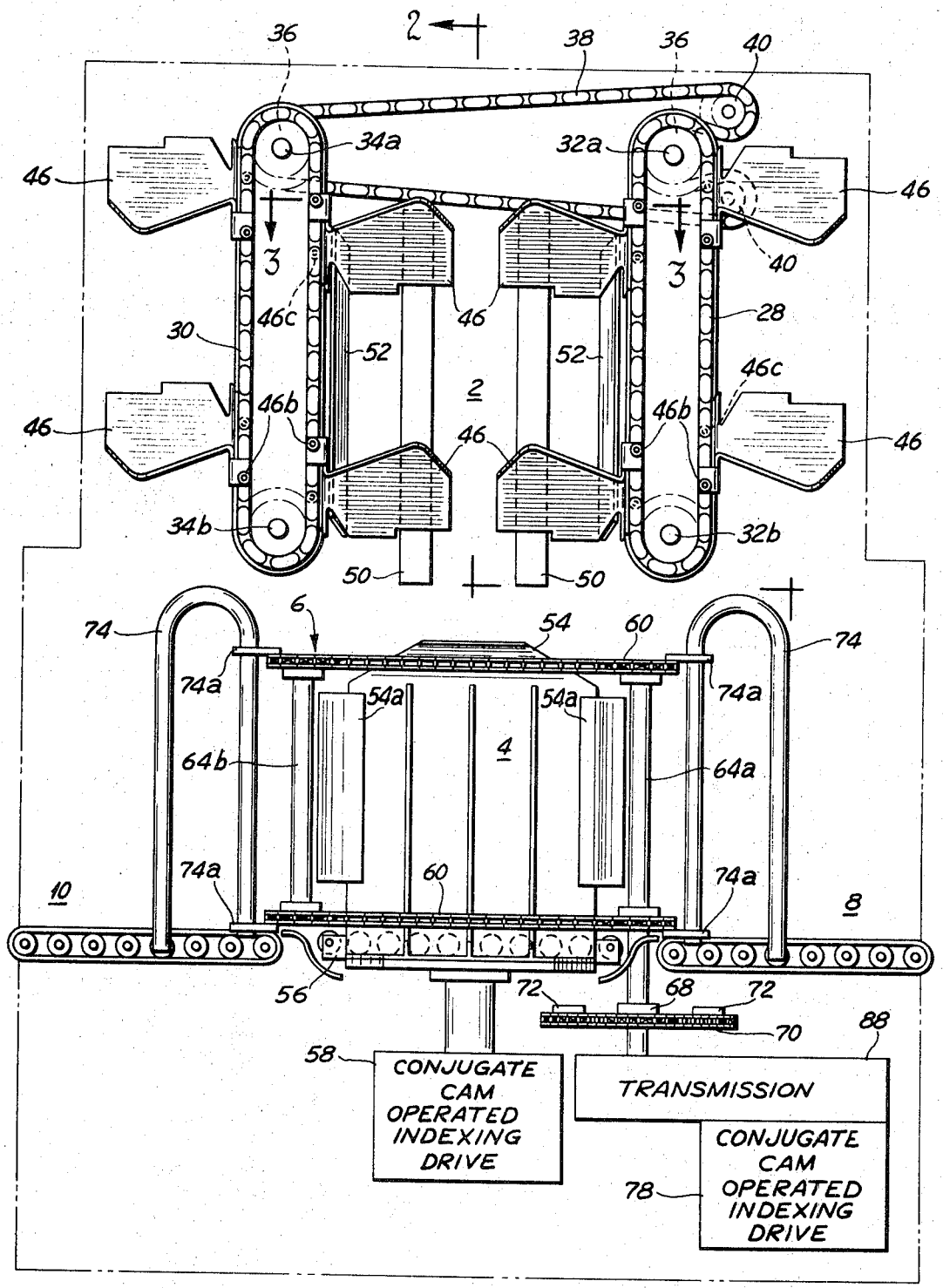
FIG. 1 is a schematic representation of the input side of the counter stacker machine of this invention, the structural framework thereof having been omitted for clarity in the drawings.
Figure 2:
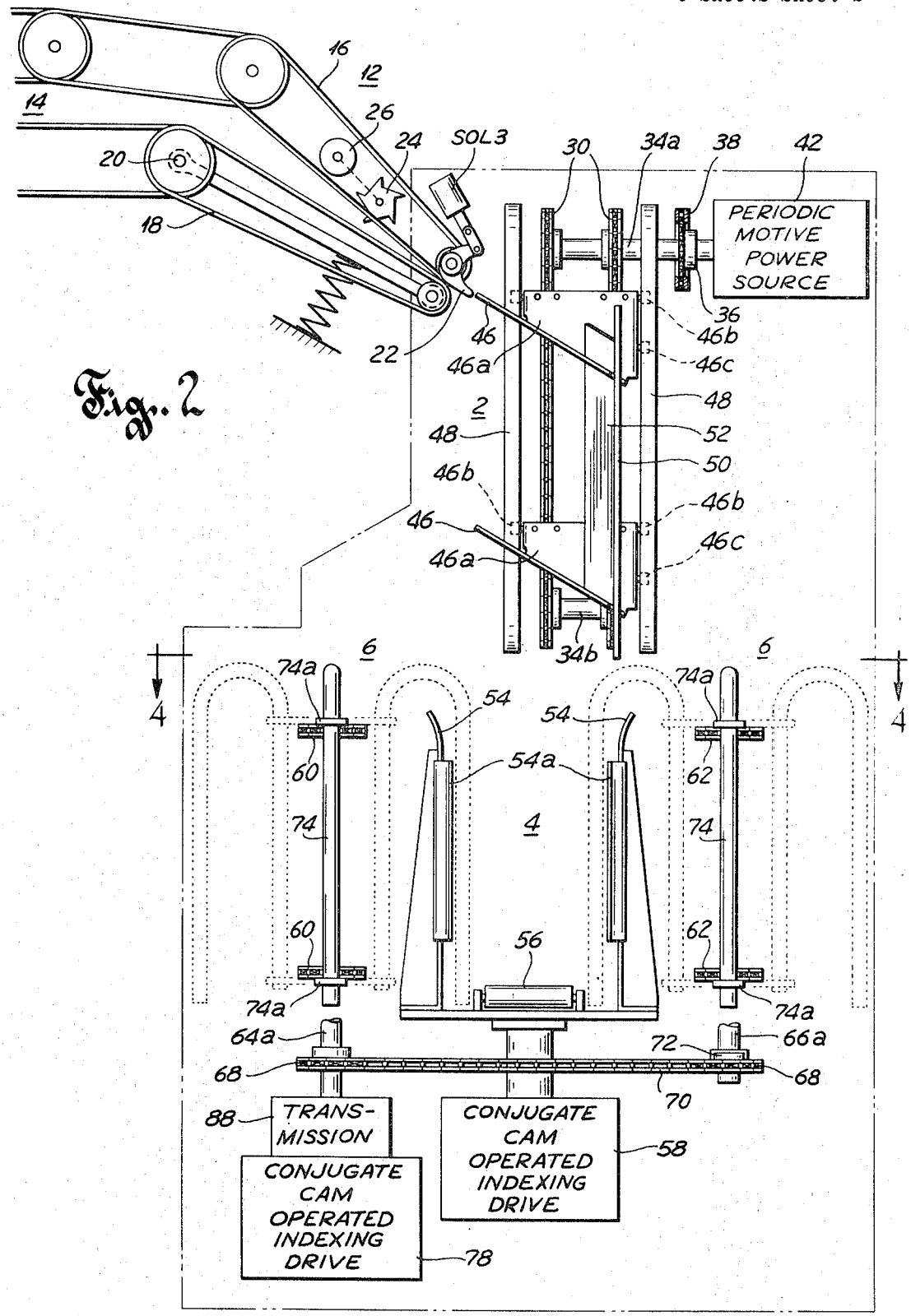
FIG. 2 is a view taken along the line 2—2 of FIG. 1.

With reference to FIG. 1 of the drawings, the counter stacker machine may be seen to comprise the following main components: a stacking section 2; a stack receiving table 4; a pusher mechanism 6; right and left output, or delivery conveyors 8 and 10, respectively; and an input and counting section 12 (see FIG. 2).

The input and counting section 12 is positioned adjacent the end of a powered wire belt conveyor 14 which transports newspapers from the press in a lapped stream. Papers are delivered to the machine from the conveyor 14 by a downwardly inclined powered conveyor section which comprises an upper belt run 16 and a lower belt run 18. The lower belt run 18 is pivotably mounted to the conveyor 14 at 20 and is spring biased upwardly to cause the output end thereof to be in engagement with the output end of the stationary upper run 16. The wire pulleys at the output ends of the upper and lower runs 16 and 18 serve as cooperating pincher rollers to positively drive the papers in the stream from the input conveyor section 12 into the stacking section 2. A paper guide member 22 is pivotally mounted to the output pulley shaft of the upper conveyor run 16 to assure that the paper stream passes beneath an upper pair of alined blade members 46 which will be described later. Paper guide 22 is shown in its normal position in FIG. 2 and may be pivoted upwardly to the position shown in FIG. 6 by energizing a solenoid SOL3 as will also be described later.

A cogwheel counter-mechanism is employed in the machine and may be preferably one such as the type disclosed in the F. S. Hyer et al Pat. No. 3,286,921, issued Nov. 22, 1966 and assigned to the assignee of this invention. For purposes of description herein, the counter is shown as having a five tooth cogwheel 24 mounted for rotation in the input conveyor section to have successive teeth depend through the upper belt run 16 into the stream path. The cogwheel 24 is mechanically coupled to a rotary impulse switch 26 which is chosen to provide five electrical impulses for one complete revolution. Thus, the folded leading edges of the papers in the stream between belt runs 16 and 18 each engage a depending tooth of cogwheel 24 to rotate it upwardly out of the stream path and rotate the next succeeding tooth into the path for engagement by the leading edge of the next paper. It may be seen that the cogwheel 24 completes one revolution for every five papers passing thereby and that the impulse switch 26 therefor provides one pulse for each paper passing the counter-mechanism.

Stacking section 2 comprises right- and left-hand sets of vertically extending, parallel endless chains 28 and 30, respectively (FIG. 1). Right-hand chain set 28 extends around upper and lower sprockets which are rigidly secured to common upper and lower shafts 32a and 2b, respectively, while the left-hand chain set similarly extends around sprockets secured to upper and lower shafts 34a and 34b, respectively. Shafts 32a and b and 34a and b are journalled for rotation in the structural framework (not shown) of the machine. A pair of drive sprockets 36 are secured to the upper shafts 32a and 34a and are interconnected by an endless chain 38 which also extends around a pair of idler sprockets 40 at the right-hand side to drive the shaft 32a in reverse rotation with respect to that of shaft 34a. While not specifically shown, the idler sprockets 40 are mounted so that their positions relative to each other are adjustable to thereby alter the position of right-hand chain set 28 with respect to left-hand chain set 30. In this way the blade members of the respective chain sets may be brought into precise alinement. Shaft 34a is connected to a periodic motive power source 42 which may preferably comprise a continuously driven electric motor M2, a single revolution mechanical clutch 44 having a disengagement cam 44a and an electromagnetic brake BR2 as shown in the control diagram in FIG. 8a.

The right- and left-hand chain sets 28 and 30 are each provided with four equally spaced stacking blades 46, the blades of the right-hand chain set 28 being formed in a mirror image to those of the left-hand chain set 30. The blades 46 are arranged along the respective chain sets so that when cooperating blades are on the adjacent vertical sides of the right- and left-hand chain sets, the latter may be adjusted as aforedescribed to cause cooperating blades to extend toward each other substantially coplaner to form split stacking platforms as may be seen particularly in FIG. 1.

Figure 3:
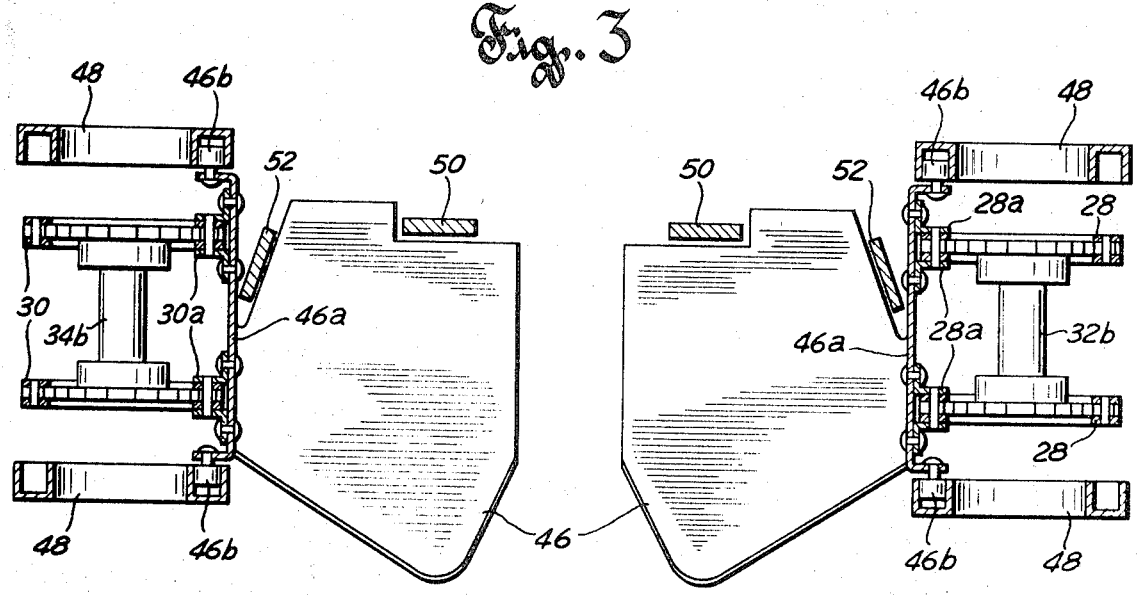
FIG. 3 is a sectional view taken along the line 3—3 of FIG. 1.

With reference to FIGS. 2 and 3, the blades 46 may be seen to extend angularly upward toward the input side of the machine. Each blade has a wedge shaped side portion 46a which is formed upwardly in a plane perpendicular to the plane of the blades. Blades 46 are attached to special bracket type links 28a and 30a of chain sets 28 and 30, respectively, by riveting the side portions 46a thereto along the upper edge thereof (FIG. 3).

The opposite ends of side portions 46a are formed to extend perpendicularly to the side portion and away from the blades. Guide rollers 46b are mounted on each end portion to extend outwardly thereof. The axis of guide rollers 46b is on substantially the same horizontal plane as the points of attachment of side portions 46a to brackets 28a or 30a. The longer end portion of wedge shaped side portion 46a has a second guide roller 46c mounted thereon in vertical alinement with the roller 46b on that end. The rollers 46b and 46c extend into guide channels 48 which are secured to the machine framework and which are shaped to define a path parallel to the chain path.

The incoming papers leave the input and counting section 12 to stack upon a cooperating pair of blades 46. The leading edges of the papers aline vertically along a pair of back guides 50 while lateral alinement of the papers is afforded by inwardly angled side guides 52. Blades 46 may be seen to be suitably notched to clear the guides 50 and 52 as the blades travel with the chains.

Stack receiving table 4 is located directly below the stacking section 2. Table 4 has a pair of upstanding side members 54 which have outwardly flared upper ends. A small narrow segment of idler roller conveyor 56 is secured to the table 4 to extend between the open ends defined by side members 54. The open ends are restricted slightly by resilient gate members 54a secured to the side members 54. The gate members 54a are formed of a light spring metal and serve to stablize the stack somewhat as it leaves the table 4.

It is often desirable to form completed stacks made up of two or more stacked batches from the stacking section. To compensate for the wedge shape of the individual batches, it is desirable to rotatably displace alternate batches by 180 degrees. To accomplish this the table 4 is journalled for rotation in the framework of the machine.

The rotational indexing of table 4 is supplied by the output of a conjugate cam operated indexing drive 58 to which input power is supplied from an electric motor M3 through an electromagnetic clutch CL3 and brake BR3 (FIG. 8b). The cam operated indexing drive is a commercially available mechanism chosen for its controlled velocity and acceleration characteristics and is classified as a two stop, 270 degree indexing period, modified sine drive. Briefly, this classification states that the output shaft of drive 58 is indexed through 180 degrees for each single revolution of the input shaft of which 270 degrees revolution are used to achieve the output while the remaining 90 degrees are dwell time provided for the control of the drive. Also, the acceleration of the output shaft through its 180 degree indexing travel is designed to be continuous and may be plotted as a curve which closely resembles a sine wave as shown at b in FIG. 9. The output shaft velocity produced by this acceleration is plotted as a curve in a of FIG. 9 and may be seen to be an extremely smooth and continuous function which allows the table 4 to be rapidly indexed without disturbing the papers thereon. A more detailed description of indexing drives of this type may be found in an article entitled "Cam-Operated Indexing Drives for Assembly Equipment" written by Mr. R. H. Kenny, Senior Mechanical Engineer, Commercial Cam and Machine Co., published in the October 1964 issue of Assembly Engineering.

To provide for greater life of the supporting parts associated with the indexing rotation of the table, the indexing rotational direction is chosen to be always in the same direction. The actual choice of rotational direction is arbitrary, the important improvement being the elimination of adverse wear factors due to the oscillating motions of prior art tables alternately indexed through pneumatic motor drives.

A pusher mechanism 6 is provided to push the stack off the table 6 onto either of the powered delivery conveyors 8 or 10. Pusher mechanism 6 includes front and rear sets of horizontally extending, parallel endless chains 60 and 62, respectively. The front chain set 60 extends around sprockets secured to common right- and left-hand shafts 64a and 64b, respectively. Similarly, rear chain set 62 extends around sprockets secured to right- and left-hand common shafts 66a and 66b, respectively. The shafts 64a and b and 66a and b are suitably journalled for rotation in the framework of the machine. A pair of drive sprockets 68 are secured to the shafts 64a and 66a and are interconnected by an endless drive chain 70 which also extends around a pair of idler sprockets 72 at the rear of the machine to provide reverse rotation of shaft 66a with respect to that of shaft 64a. The mounting of idler sprockets 72 is such that they can be adjustably positioned relative to one another to afford alinement of cooperating pusher bars 74 in the same manner as described earlier in connection with the chain sets 28 and 30 and their cooperating blades 46.

Figure 4:
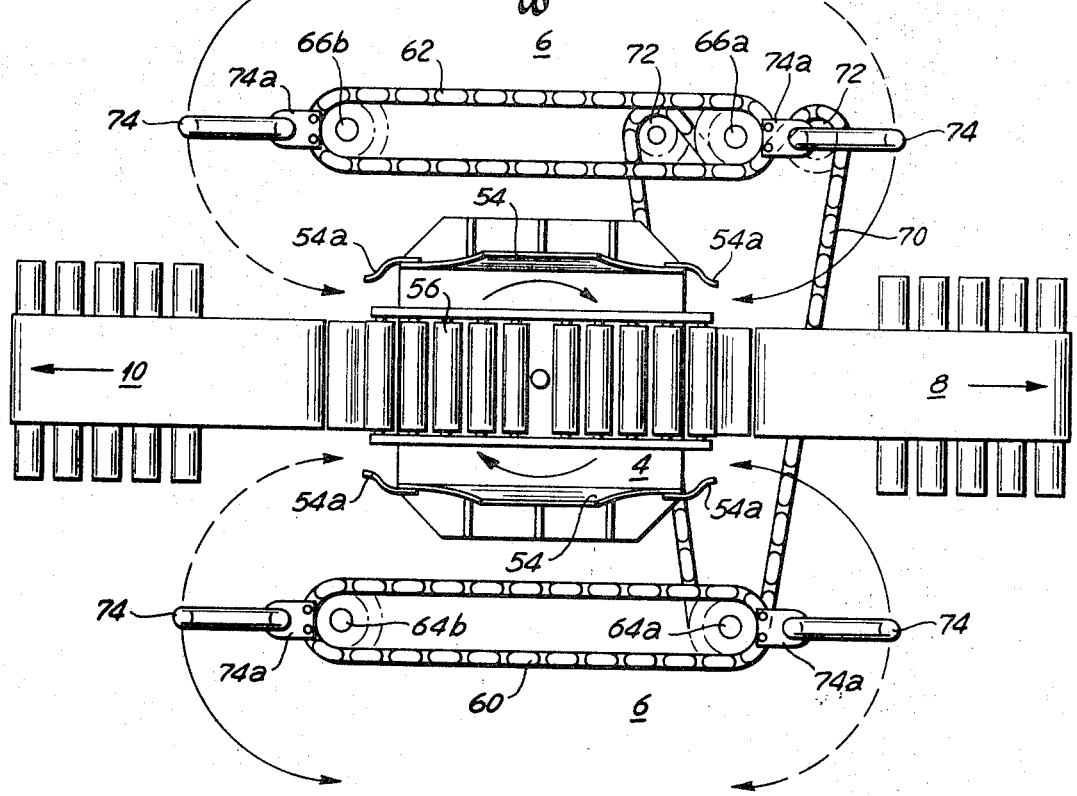
FIG. 4 is a top view of the lower unit of the counter stacker machine taken along the line 4—4 of FIG. 2.

Each chain set 60 and 62 is provided with a pair of inverted U-shaped pusher bars 74 which are mounted to the chain links by brackets 74a. The bars of each chain set are spaced on the chains by one-half the chain length to extend outwardly along the centerline between the right- and left-hand shafts of the respective chain set in their normal position as shown in FIG. 4. In that figure it may also be seen that rotation of the chain sets 60 and 62 in the direction of either the solid line or broken line arrows depicted thereon will carry the downwardly extending outer legs of the bars 74 across the surface of table 4 between the conveyor segment 56 and the respective sides 54. With reference to FIG. 2 it may be seen in the dotted line representation of the rotated pusher mechanism that the lower ends of the outer legs of bars 74 extend below the plane of conveyor segment 56 and just clear the surface of table 4. A stack of papers on table 4 will extend over the edges of conveyor segment 56 on both sides of the table to points very near each of the side plates 54. Hence, the movement of pusher bars 74 across the table engages the respective end of the stack to push it off the table 4 and onto either the right or left powered delivery conveyors 8 or 10, respectively.

Since the stack on table 4 may comprise one or more batches and contain a total number of papers providing stack height of approximately twenty inches, it has a strong tendency to be unstable. However, with papers entering the machine at press speeds in excess of 70,000 impressions per hour, the stack must be removed from the table and onto one of the delivery conveyors very quickly to make room for the next batch stacking on the blades 46.

It therefore becomes important to control the acceleration and velocity of the pusher bars 74 as they engage the end of the stack and transfer the stack to the delivery conveyors. The pusher bars must move rapidly from their original positions to the points of stack engagement in order to use as little cycle time as possible, yet the bars must not hit the stack with a velocity that will rebound the stack away from the bars upon impact and cause spilling of the stack. Ideally the velocity of the bars 74 should be increasing sufficiently at this point to maintain good continuous engagement with the stack.

As the pusher bars move the stack onto one of the delivery conveyors, it becomes equally important that the velocity of the bars and the velocity of the delivery conveyor be such that the stack pulls away from the pusher bars 74. The arcuate paths of the pusher bars 74 around the sprockets provide a "crack-the-whip" acceleration to the bars. If the stack has not pulled sufficiently away from the bars, the latter may slap the end of the unstable stack, causing it to spill. The foregoing requirements for pusher movement must be the same in each direction of travel since the machine is designed to deliver in either direction.

To meet above requirements for the pusher motion we have provided a second conjugate cam operated indexing drive 78. The drive 78 is very similar to drive 58 for table 4, except that the cam motion chosen herein provides a cycloidal motion, the output velocity and acceleration curves of which are shown in FIG. 1 at parts a and b, respectively. The difference in the velocity curve shown in part a of FIG. 10 over that in FIG. 9, part a, resides in the somewhat flatter end portions during which the pusher bars 74 are moving up to engage the stack. As was the case with drive 58, a single revolution of input to drive 78 provides 90 degrees of dwell and 270 degrees of operation to delivery an output of 180 degrees of controlled acceleration, indexing rotation.

The input to drive 78 is provided by an electric motor M4 (FIG. 8b). The shaft of motor M4 is connected to the input shaft of a reversing transmission 80 which in turn has its output shaft connected to the input of indexing drive 78. An electromagnetic brake BR4 is operatively connected to the output shaft of transmission 80. Within reversing transmission 80 a notched belt 82 directly connects pulleys fixed to the input shaft and to the input end of a unidirectional electromagnetic clutch CLR. The latter may be energized to drive the output shaft of the transmission in a rotational direction to cause ejection of a stack onto the right-hand delivery conveyor 8. Also provided on the input shaft of transmission 80 is a gear 84 which meshes with a reversing gear 86 mounted on the input end of an electromagnetic clutch CLL. Energization of the latter will cause the output shaft to be driven freely through the clutch CLR in a reverse direction to cause ejection of a stack onto the left-hand delivery conveyor 10.

To complete the drive to pusher mechanism 6, a step-up transmission is provided between the shaft 64a of the pusher mechanism and the indexing output shaft of drive 78. The transmission 88 is preferably of the chain and sprocket type to reduce backlash tendencies when the pushers are run in the oscillating motion. The input to output ratio of transmission 88 is such to cause the pusher bars 74 to move through one-half of a complete cycle or, with reference to FIG. 4, to cause the bars 74 to exchange locations from those of the position shown.

OPERATION

Figure 8A:
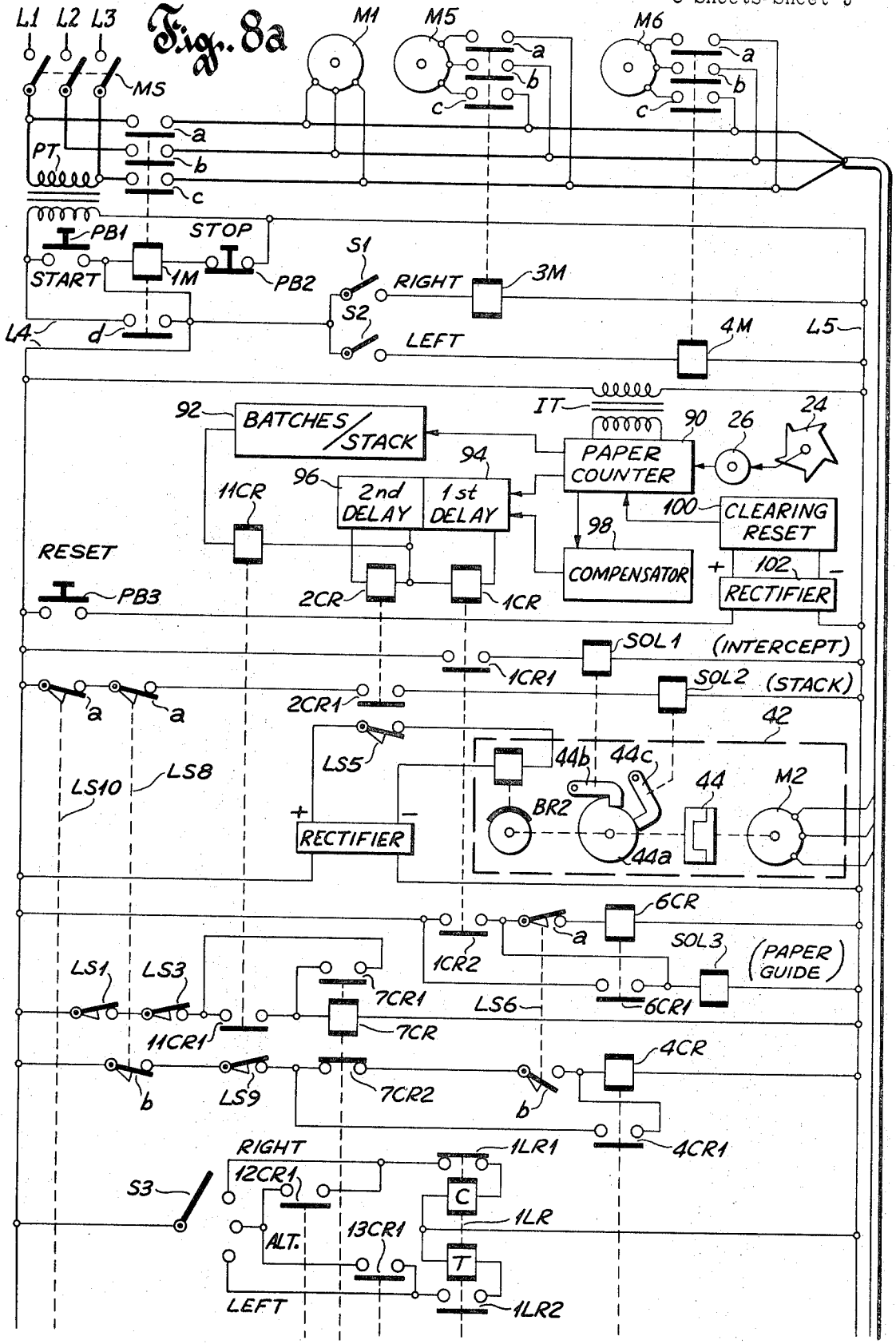

Having briefly described the physical arrangements of the machine, the operation thereof will now be described with particular reference to FIGS. 8a and 8b, taken together.

A main switch MS is closed to connect the system to a 3-phase A.C. power source. A power transformer PT has its primary winding connected across supply lines L1 and L3 and has its secondary winding connected to lines L4 and L5 to supply reduced voltage A.C. power to the control circuit. Lines L1, L2 and L3 are further connected through the normally open contacts a, b and c, respectively, of a main starting contactor 1M to input conveyor motor M1, stacking section motor M2, table motor M3 and pusher motor M4. The right and left delivery conveyor motors M5 and M6, respectively, are also connected to lines L1, L2 and L3 through the normally open contacts of control contactors 3M and 4M, respectively.

As mentioned earlier the machine may be set to deliver stacks at either right delivery conveyor 8 or left delivery conveyor 10, or alternately at both conveyors. The choice of delivery is made by setting a plurality of selector switches S1, S2 and S3 to the proper positions, the switches preferably being combined into a single unit in practice. For this description we will choose to deliver stacks at right delivery conveyor 8; therefore, switch S1 will be closed, switch S2 will remain open and switch S3 will be set to the position marked "RIGHT" on the drawings.

The machine is further provided with a counting and compensating control circuit for initiating the operation of the machine at the proper timed instant. The counting and compensating circuit is disclosed and claimed in J. W. Loeffler Pat. No. 3,027,817, issued Apr. 3, 1962 and assigned to the assignee of this invention, and therefore only briefly described and shown herein.

The counting and compensating circuit comprises an electronic paper counter 90, a batches per stack counter 92, first and second delay counters 94 and 96, respectively, and a compensator module 98. In a basic sense, the circuit initiates operation of the machine at some precise moment after the cogwheel 24 and impulse switch 26 have transmitted the pulse corresponding to the paper, or article, completing the counted batch. The circuit measures this time difference as functions of conveyor speed, distance traveled between the cogwheel 24 and the intercept point, and the operating time of the periodic motive power source 42.

The primary winding of an isolating transformer IT is connected across lines L4 and L5 and the secondary winding is connected to a D.C. rectifier within the electronic paper counter 90. The latter receives input lines from the impulse switch 26 and from a clearing reset module 100. Counter 90 further has three output lines to deliver signals to the batches per stack counter 92, the first delay counter 94 and to the compensator module 98. Batches per stack counter 92 has an output line connected to a control relay 11CR, while compensator module 98 has an output line connected to the first delay counter 94. The outputs of first and second delay counters 94 and 96, respectively, are respectively connected to a pair of control relays 1CR and 2CR. Electronic paper counter 90 is adjustable to count any desired number of pulses between 1 and 100 and will count out at the set number to deliver output pulses and reset itself. The batches per stack counter 92 is a device similar to counter 90, but preferably has a lesser range. The settings of counter 90 and batches per stack counter 92 may be accomplished either manually or by means of a programming circuit (not shown). The compensator module 98 preferably comprises an inpulse generator driven by the conveyor to generate pulses in direct proportion to conveyor speed, and an adjustable fixed time compensator which is set to the time necessary for the components of the periodic motive power source 42 to react to an input signal.

In addition to the aforementioned settings of selector switches S1, S2 and S3, let it be assumed that paper counter 90 has been manually set to 25 and batches per stack counter 92 has been manually set to 2. The machine will therefore continuously deliver double batch stacks of twenty-five papers per batch to the right delivery conveyor 8.

The machine is started by momentarily depressing pushbutton START switch PB1 to energize the main contactor 1M across the lines L4 and L5. Contactor 1M closes its normally open contacts a, b and c to start the input conveyor motor M1, the stacking motor M2 in periodic motive power source 42, table motor M3, and pusher mechanism motor M4. Contactor 1M also closes its d contact to hold itself energized around the START switch PB1 through a normally closed STOP switch PB2. Closure of contact d of contactor 1M also energizes contactor 3M across the lines L4 and L5 through the closed selector switch S1 to close the normally open contacts a, b and c of the contactor 3M and start the right delivery conveyor motor M5.

Line L4 is connected through the normally open d contact of main contactor 1M to remove power to the remainder of the control circuit when the machine is shut down. With the contactor 1M energized, power is supplied to the control circuit through lines L4 and L5 and the C coil of a latching relay 1LR is energized through the selector switch S3. Latching relay 1LR reverses its contact mode upon energization of the C coil thereof to open contacts 1LR1 and 1LR4 and to close contacts 1LR2 and 1LR3 thereof. The relay is latched in this mode until a pulse is sent to the T coil thereof to operate it in the reverse direction.

Isolation transformer IT delivers power to the paper counter 90 upon connection of the control circuit to the power transformer PT. The electronic counting and compensating circuit begins to transmit signals as it builds up to its operating potential, to cause the machine to run through an operational cycle. A reset circuit 100 is provided to clear the counter 90 upon reaching its operating potential, the circuit herein being shown under the control of a manual pushbutton switch PB3 connected through a rectifier 102 across lines L4 and L5. Depression of pushbutton PB3 subsequent to starting the machine will stop the operational cycling of the machine and clear the counting and compensating circuit to prepare it to receive the incoming papers. The manual control of clearing reset circuit 100 may be augmented by an automatic reset control circuit (not shown) to reset the counting and compensating circuit once the components have reached their operating potential. Once the circuit is reset, the machine is ready to receive papers from the press.

The papers are delivered from the press in a lapped stream through conveyor 14 to the input and counting section 12 (FIG. 5). The folded leading edge of each paper engages a depending tooth of cogwheel 24 to rotate the cogwheel as the papers pass thereby. The papers are driven out of the input section 12 by the wire belts 16 and 18 and the pincher rollers at the ends thereof to pass under the paper guide 22 and fall onto the cooperating set of stacking blades 46. The leading edges of the papers aline vertically along the guides 50. In FIGS. 5 and 6, the reference character 46' is utilized to indicate the upper cooperating pair of blades which are to be the intercept blades in this instance, the plain numeral 46 indicating the lower pair, or stacking blades.

Rotary impulse switch 26 delivers an individual pulse to the electronic paper counter 90 for each paper passing the cogwheel 26. Upon receiving the pulse of the twenty-fifth paper the counter 90 responds to reset itself to zero and to transmit single output pulses to the batches per stack counter 92, first delay counter 94 and compensator module 98. First delay counter 94 is turned on by the input pulse from counter 90 to receive pulses from compensator 98. The latter responds to the input signal to supply pulses at a first rate from the impulse generator thereof over the period of time set on the aforementioned fixed time compensator and thereafter supplies pulses to the first delay counter 94 at a second rate.

When the required number of pulses are received by the first delay counter 94, the latter pulses control relay 1CR to close the contacts 1CR1 and 1CR2 thereof. Closure of contacts 1CR1 energize an intercept solenoid SOL1 across lines L4 and L5 to withdraw a clutch stop lever 44b from the clutch disengagement cam 44a of single revolution clutch 44, thereby releasing the cam to engage the clutch. Motor M2 then drives the cooperating adjacent blade sets 46 and 46' downwardly a distance of approximately one inch through shaft 34a and the connected chain sets 28 and 30. The counting and compensating circuit functions to provide this downward movement just after the leading edge of the twenty-fifth paper passes below the outermost ends of the upper set of blades 46'. The closure of contacts 1CR2 energizes a holding relay 6CR across lines L4 and L5 through the normally closed a contacts of a limit switch LS6. Relay 6CR in turn closes its 6CR1 contacts to maintain itself energized around the 1CR2 contacts and to energize a solenoid SOL3 which pivots paper guide 22 upwardly at the input section 12 as seen in FIG. 6.

The pulsed relay 1CR drops out to reopen the contacts 1CR1 and 1CR2 and solenoid SOL1 therefore releases lever 44b to ride upon the peripheral surface of cam 44a. Paper guide solenoid SOL3 remains energized through the maintained relay 6CR which is now under the control of the limit switch LS6 which will be operated at a later time by a rotary cam (not shown) secured to the shaft 32a of stacking section 2.

The above mentioned downward indexing of the stacking blades 46 and intercept blades 46' causes interception of the paper stream at the twenty-sixth paper as seen in FIG. 6. The cooperating set of blades 46', which were shown in FIG. 5 as being positioned just above the paper stream as it left the input section, are driven downwardly into the stream as the leading edge of the twenty-fifth paper passes therebelow to intercept the leading edge of the twenty-sixth paper and divert it and the succeeding papers on top of the blades 46'. Paper guide 22 is pivoted upwardly to allow clearance for the lapped stream to follow the twenty-sixth, or intercept, paper. FIG. 5 depicts the mechanism at an instant just prior to the leading edge of the twenty-fifth paper passing below the tips of the blades 46', while FIG. 6 depicts the mechanism at the instant the twenty-fifth paper has settled upon the stack on the lower blade pair 46.

The first delay counter module 94, upon operating to energize relay 1CR, further sends a pulse to turn on second delay counter 96. The second delay counter then receives pulses from the impulse generator to provide a time period of sufficient length to allow the trailing edge of the twenty-fifth paper to clear the pincher rollers and to allow that paper to settle substantially upon the top of the batch formed on the lower cooperating pair of stacking blades 46 (FIG. 6). When the correct number of pulses are received, the second delay counter 96 operates to pulse control relay 2CR to momentarily close the contacts 2CR1 thereof.

The closure of contacts 2CR1 energizes solenoid SOL2 across lines L4 and L5 to withdraw clutch stop lever 44c from the clutch cam 44a to engage the clutch 44 whereby motor M2 drives the chain sets 28 and 30 and the respective cooperating adjacent blade pairs 46 and 46' downward. The initial increment of travel is driven through brake BR2, as was the intercept travel, until a rotating cam (not shown) secured to the shaft 32a releases a limit switch LS5 to open the circuit to the brake BR2. Once rotation of the shaft 34a through the output side of clutch 44 has begun, the lever 44c may be released against the periphery of the clutch cam 44a.

Motor M2 of periodic motive power source 42 drives the chain sets 28 and 30 through the remainder of one complete revolution of shaft 34a to drive the blade pairs 46 and 46' downwardly. Blade pair 46' moves to the position occupied by blade pair 46 in FIG. 5, while the blade pair 46 travels around the lower sprockets of the chain sets 28 and 30 as shown in FIG. 7 guided by the rollers 46b and 46c traveling in the aforementioned guides 48. The speed with which the chains are driven is chosen to be such as to provide free fall for the stack of papers on blades 46 without causing the undersides of blades 46' to hit the top of the stack. The lower sprocket size is chosen to be such that the blade pair 46 move therearound with an angular velocity sufficient to quickly withdraw the blades from under the stack leaving it unobstructed in free fall onto the table 4. A subsequent pair of blades move around the upper set of sprockets during this indexing movement of the chain sets 28 and 30 to the ready-to-intercept position occupied by the blades 46' in FIG. 5 thereby becoming the next set of intercept blades.

As the chain sets and blades index due to the rotational drive of motor M2, the limit switch LS6 is tripped by its cam on shaft 32a to drop out the relay 6CR and the solenoid SOL3. The latter returns the paper guide 22 to its original position while the paper stream is being collected on the blades 46' which are indexing to the stacking position. Limit switch LS6 further closes its b contact to energize a relay 4CR across lines L4 and L5 through the b contact of a limit switch LS8, a limit switch LS9 and the normally closed contacts 7CR2 of a control relay 7CR. Relay 4CR maintains itself energized by its contacts 4CR1 which hold around the 7CR2 contacts and the b contacts of LS6.

In FIG. 8b it may be seen that energization of relay 4CR also opens a set of normally closed contacts 4CR2 to deenergize and releases the brake BR3 on the table drive, and closes a set of normally open contacts 4CR3 to engage clutch CL3. The tripping of LS6 is set to occur at a point in time wherein the batch is contained within the table 4, and the above mentioned deenergization of brake BR3 and engagement of clutch CL3 cause motor M3 to drive the table 4 through a 180 degree index through the indexing drive 58.

The drive to table 4 is interrupted by a stop limit switch LS9 which is operated by a cam (not shown) on the underside of the table 4. Limit switch LS9 is operated to open the circuit to relay 4CR in advance of the final table position to allow the clutch CL3 and brake BR3 time for response. A second cam (not shown) is also mounted to the underside of table 4 to hold an interlocking limit switch LS10 closed when the table is in its proper, fully indexed position. The switch LS10 does not close until the table reaches its full travel, and the contact a of limit switch LS10 holds the circuit to solenoid SOL2 open until the table is so indexed to prevent initiation of a stacking blade indexing cycle wherein the blades 46' might strike the table as they travel around the lower sprockets.

During the rotation of table 4, paper counter 90 may count out to initiate another machine cycle. In this instance the pulse to batches per stack counter 92 causes that module to reset and energize the 11CR relay connected thereto. Relay 11CR sets up an ejection circuit which will cause the pushers to move the stack onto the right delivery conveyor 8 when this batch is deposited on table 4. Relay 11CR therefore closes its 11CR1 contact to energize a control relay 7CR across lines L4 and L5 through series connected limit switches LS1 and LS3. Energized relay 7CR maintains itself around contacts 11CR1 of pulsed relay 11CR through its normally open contacts 7CR1 and opens its contacts 7CR2 to prevent the table rotate control relay 4CR from being energized. In FIG. 8b it may be seen that relay 7CR further closes its 7CR3 contacts to set up a pusher mechanism circuit under the control of a normally open limit switch LS7.

In the same manner as before described, first and second delay counters 94 and 96 operate to energize relays 1CR and 2CR, respectively, in a sequential manner, thereby causing interception of the stream and subsequent indexing of the blades to drop the next batch upon the batch already in table 4. Rotation of shaft 32a of the stacking section rotates another cam (not shown) to operate limit switch LS7. The latter limit switch is controlled similar to LS6, that is, it operates at a point in time wherein the batch has dropped onto the first batch, whereas LS6 operated when the first batch had settled on the table.

Limit switch LS7 closes to energize a holding relay 9CR which maintains itself through its 9CR1 contacts around the b contacts of interlocking limit switch LS10 and limit switch LS7, and the latter further energizes a control relay 5CR through the closed contacts 1LR3 of latching relay 1LR. Relay 5CR closes its contacts 5CR1 to energize a solenoid SOL4 of a right drive clutch CLR within the reversing transmission 80. Relay 5CR further opens its 5CR2 contact to release brake BR4 on the output shaft of transmission 80. Motor M4 then drives the chain sets 60 and 62 through the reversing transmission 80, indexing drive 78, transmission 88 and shaft 64a to index the pusher bars 74 in the direction of the dotted arrows of FIG. 4. The bars travel across the table to engage the double batch stack and push it onto right delivery conveyor 8 where it is carried off to other conveyors.

It should be noted that the pusher control is prevented from operating until the table 4 is in its proper, completely indexed, position by the contact b of interlocking switch LS10. Once the pusher mechanism begins its movement it is under the control of limit switch LS2 which is operated by a cam (not shown) carried by the chain set 62. Chain set 62 actually carries double sets of cams since the chain set travels only one-half its length for a complete operation. Limit switch LS2 is operated just prior to the completion of an indexing of the pusher mechanism to open its *b* contact and drop out the 5CR relay. The latter then causes the clutch CLR to be disengaged and the brake BR4 to be applied to stop the pusher mechanism.

An interlocking limit switch LS8 is operated by a cam (not shown) on the chain set 62 to prevent the stacking section from operating until the pusher bars 74 are in their final positions, the cam thereby operating LS8 in the final position to close the *a* contacts thereof in the SOL2 circuit. The *b* contacts of LS8 prevent the table control relay 4CR from being energized until the pusher bars have arrived in their final position. Another limit switch LS1 is operated by a cam on chain set 62 to drop out control relay 7CR after the pusher mechanism has started its motion.

When the pusher mechanism closes limit switch LS8, the machine is again ready to index the stacking mechanism in response to a count out of counter 90. Repetitive cycles of: intercept—stack and drop—rotate table—intercept—stack and drop—eject right, will continue as long as papers enter the machine and the settings are maintained.

If single batch stacks are desired, the batches per stack counter 92 may be set to one and the relay 11CR will be pulsed each time the paper counter 90 counts out. In this way the table rotate control relay 4CR will be disconnected from the circuit by relay 7CR which will also cause the pusher mechanism to function after each batch is dropped.

Ejection on left delivery conveyor 10 may be accomplished by opening switch S1, closing switch S2 and moving switch S3 to the position marked "LEFT" on the drawings. In this mode, the latching relay 1LR is pulsed to assume the position depicted in the drawings, the left motor M6 is operating instead of motor M5 and the pusher mechanism is stopped by limit switch LS4 which is in a mirror image relationship to LS2. Similarly, a limit switch LS3 is provided in a mirror image relation to LS1 to control relay 7CR in the delivery left mode. The pusher mechanism control relay is 3CR for delivery left which controls a clutch solenoid SOL5 for left drive clutch CLL of transmission 80 to provide a reverse drive to the output shaft.

Alternate delivery is also provided by closing both switch S1 and S2 and setting switch S3 to the position marked "ALT." on the drawing. With the latching relay 1LR in the mode depicted in the drawings, initial delivery will be to the left.

An indexing of the pusher mechanism to eject the first stack to the left will cause tripping of limit switch LS4 to stop the mechanism as aforedescribed. Limit switch LS4 also closes its *a* contacts to energize a relay 13CR. (FIG. 8*b*). Relay 13CR closes its contact 13CR1 (FIG. 8*a*) to energize the T coil of latching relay 1LR and reverse the contact mode. The reversal of 1LR places right control relay 5CR in the circuit and left control relay 3CR out of the circuit to set up ejection to the right on the next operation of pusher mechanism 6. Limit switch LS2 operates on a right delivery cycle to close its contact *a* and energize a relay 12CR (FIG. 8*b*) to close the contact 12CR1 (FIG. 8*a*) and pulse coil C of relay 1LR. The latching relay therefore continues to reverse its contact mode upon each ejection of a stack to provide alternate delivery.

Thus, there is provided a counter stacking machine which has an endless path of intercepting and stacking blades, or platforms, traveling past an input section to receive papers therefrom. Continuously driven motors are connected through quick acting accurately control rotary clutches and brakes to provide fast response to the mechanisms. The stacked papers are delivered to a rotatable table under free fall conditions and ejected to either right or left as required. The stacks are moved with optimum speed and the moving elements of the machine are operated by a sequential, precision control scheme.

While but a single preferred embodiment has been disclosed herein, it is to be understood that the invention is susceptible to various modifications without departing from the spirit and scope of the appended claims.

We claim:

1. In an apparatus for conveying, counting and stacking articles being delivered in a stream, the combination with a conveyor and means for counting said articles as they pass a given point in the travel of said conveyor;
   of stacking means at the output end of said conveyor comprising:
   a pair of like endless carriers which move in spaced apart vertically alined closed loop paths;
   a plurality of like numbers of blade members spaced at equal distances along said carriers, said blade members of each of said carriers being in alinement in adjacent portions of said carrier paths;
   stationary vertical guide members positioned between adjacent portions of the carrier paths to one side of the alined blade members opposite the output end of said conveyor;
   and means, including carrier drive means, responsive to completion of a count of a predetermined number of articles to cause driving of said carriers in opposite directions in synchronism a given distance wherein a pair of alined blades immediately above another alined pair of blades on which articles of said count are being stacked is moved downwardly, into the stream of articles issuing from the output end of said conveyor to intercept the first articles of a succeeding count of articles and effect stacking of it and following articles of the latter count thereupon;
   said last mentioned means further including means which, after a delay interval, effects driving of said carriers another further distance to move the alined blades holding a completed stack of articles into non-adjacent portions of the carrier paths to remove support from under such completed stack of articles; and wherein said carrier drive means includes rotary motive power means and single revolution clutch means operable to couple said motive power means to said endless carriers, said clutch means including a clutch disengagement cam mounted for rotational movement therewith and having means thereon for engagement with retractable stop means to provide disengagement of said clutch means, a plurality of retractable stop means positioned to extend along the periphery of said cam means in the unretracted positions thereof, and wherein said means responsive to completion of a count of a predetermined number of articles further includes means operable to retract a first one of said plurality of retractable stop means to engage said clutch means to cause driving of said carriers, said cam means being rotated thereby to cause said means thereon to engage a next one of said retractable stop members to provide disengagement of said clutch means, and said means, which, after a delay interval, effects driving of said carriers includes means operable to retract said last mentioned retractable stop member to engage said clutch means to cause driving of said carriers another further distance.

2. In an apparatus for conveying, counting, and stacking articles being delivered in a stream, the combination with a conveyor and means for counting said articles as they pass a given point in the travel of said conveyor;
   of stacking means at the output end of said conveyor comprising:
   a pair of like endless carriers which move in spaced apart vertically alined closed loop paths;

a plurality of like numbers of blade members spaced at equal distances along said carriers, said blade members of each of said carriers being in alinement in adjacent portions of said carrier paths;

stationary verticle guide members positioned between adjacent portions of the carrier paths to one side of the alined blade members opposite the output end of said conveyor;

and means, including carrier drive means, responsive to completion of a count of a predetermined number of articles to cause driving of said carriers in opposite directions in synchronism a given distance wherein a pair of alined blades immediately above another alined pair of blades on which articles of said count are being stacked is moved downwardly into the stream of articles issuing from the output end of said conveyor to intercept the first article of a succeeding count of articels and effect stacking of it and following articles of the latter count thereupon;

said last mentioned means further including means which, after a delay interval, effects driving of said carriers another further distance to move the alined blades holding a completed stack of articles into nonadjacent portions of the carrier paths to remove support from under such completed stack of articles to release said stack in free fall;

together with stack receiving means located below said adjacent portions of said carrier paths to receive said released stack of articles thereon, and pusher means, said pusher means comprising:

a second pair of like endless carriers which move in spaced apart horizontally extending closed loop paths, said paths being located on opposite sides of said stack receiving means;

a plurality of like numbers of pusher members spaced at equal distances along said second pair of carriers being in alinement in adjacent portions of said carrier paths;

and means, including drive means for said second pair of carriers, responsive to the driving of the first mentioned carriers said another further distance to cause driving of said second pair of carriers in opposite directions in synchronism a given distance wherein an alined pair of pusher members are moved across said stack receiving means from a position at one end thereof to a like position at the other end thereof to engage a completed stack thereon and move said stack off said stack receiving means.

3. The combination according to claim 2 wherein said drive means for said second pair of carriers includes reversing means for selectively reversing the direction of said carriers.

4. The combination according to claim 3 wherein said drive means further includes means for providing a continuous and controlled acceleration of said second pair of carriers throughout said given distance.

5. The combination according to claim 2 together with means responsive to the driving of the first mentioned carriers said another further distance to cause rotation of said stack receiving means end for end when a completed stack of articles is received thereon, said last mentioned means including control means operative to preclude driving of said second pair of carriers during an operative cycle of said apparatus in which said stack receiving means is rotated.

6. The combination according to claim 5 wherein said means to cause rotation of said stack receiving means includes means for providing a continuous and controlled acceleration of said stack receiving means throughout said rotation thereof.

References Cited

UNITED STATES PATENTS

| | | | |
|---|---|---|---|
| 2,413,979 | 1/1947 | Lamb | 214—6 X |
| 2,825,475 | 3/1958 | Roberts | 93—93.3 X |
| 3,088,604 | 5/1963 | Nilsson. | |
| 3,292,505 | 12/1966 | Wiseman | 93—93.3 |
| 3,306,173 | 2/1967 | Robinson | 93—93.3 |
| 3,418,895 | 12/1968 | Palmer. | |
| 3,420,386 | 1/1969 | Morrow et al. | |

GERALD M. FORLENZA, Primary Examiner

R. J. SPAR, Assistant Examiner

U.S. Cl. X.R.

93—93; 198—163